Patented Feb. 7, 1950

2,496,659

UNITED STATES PATENT OFFICE 2,496,659

PRODUCTION OF NITRILES

William I. Denton, Woodbury, and Richard B. Bishop, Haddonfield, N. J., assignors to Socony-Vacuum Oil Company, Incorporated, a corporation of New York No Drawing. Application July 19, 1947, Serial No. 762,200

9 Claims. (Cl. 260—465.3)

This invention relates to a process for producing nitriles, and is more particularly concerned with a catalytic process for producing nitriles from olefinic hydrocarbons.

Nitriles are organic compounds containing combined nitrogen. Their formula may be represented thus:

$$R-C\equiv N$$

in which R is an alkayl or an aryl group. These compounds are very useful since they can be converted readily to many valuable products such as acids, amines, aldehydes, esters, etc.

As is well known to those familiar with the art, several processes have been proposed for the preparation of nitriles. In general, however, all of these processes have been disadvantageous from one or more standpoints, namely, the relatively high cost of the reactants employed and/or the toxic nature of some of the reactants and/or the number of operations involved in their ultimate preparation. For example, aliphatic nitriles have been synthesized by oxidizing hydrocarbons to acids followed by reacting the acids thus obtained with ammonia in the presence of silica gel. Other methods involve reacting alkyl halides with alkali cyanides, reacting ketones with hydrogen cyanide in the presence of dehydration catalysts, etc. Aromatic nitriles have been synthesized by reacting alkali cyanides with aromatic sulfonates or with aromatic-substituted alkyl halides; by reacting more complex cyanides such as potassium cuprous cyanide, with diazonium halides; by reacting isothiocyanates with copper or with zinc dust; and by reacting aryl aldoximes with acyl halides.

We have now found a process for producing nitriles which is simple and inexpensive, and which employs non-toxic reactants.

We have discovered that nitriles containing at least two carbon atoms can be prepared by reacting olefinic hydrocarbons with ammonia, at elevated temperatures, in the presence of catalytic material containing metal salts of tungstic or molybdic acids or nickel salts of acids that are stable under the conditions of reaction. Furthermore, we have discovered that the reactions of this invention can be accomplished at atmospheric pressure.

Our invention is to be distinguished from the conventional processes for the production of hydrogen cyanide wherein carbon compounds, such as carbon monoxide, methane, and benzene, are reacted with ammonia at elevated temperatures in the presence of alumina, nickel, quartz, clays, oxides of thorium and cerium, copper, iron oxide, silver, iron, cobalt, chromium, aluminum phosphate, etc. The process of the present invention is also to be distinguished from the processes of the prior art for the production of amines wherein hydrocarbons are reacted with ammonia at high temperatures, or at lower temperatures in the presence of nickel.

Accordingly, it is an object of the present invention to provide a process for the production of nitriles containing at least two carbon atoms. Another object is to afford a catalytic process for the production of nitriles containing at least two carbon atoms. An important object is to provide a process for producing nitriles containing at least two carbon atoms which is inexpensive and commercially feasible. A specific object is to provide a process for producing nitriles containing at least two carbon atoms from olefinic hydrocarbons. Other objects and advantages of the present invention will become apparent to those skilled in the art from the following description.

Broadly stated, our invention provides an inexpensive and commercially feasible process for the production of nitriles containing at least two carbon atoms, which comprises reacting an olefinic hydrocarbon with ammonia, in the gaseous phase and at elevated temperatures, in the presence of catalytic material containing a metal salt of tungstic acid or molybdic acid or a nickel salt of an acid that is stable under the conditions of reaction. Most mineral acids form salts with nickel that are stable under reaction conditions.

Generally speaking, any olefinic hydrocarbon having at least one olefin group (>C=C<) is suitable as the hydrocarbon reactant in the process of our invention. Ethylene, propylene, butenes, octenes, methyl heptenes, butadienes, pentadienes, ethyl butenes, hexadienes, heptenes, pentenes, etc. may be mentioned by way of non-limiting examples. It will be clear from the discussion of reaction temperatures set forth hereinafter, that many olefinic hydrocarbons are not present per se when in contact with ammonia and a catalyst of the type used herein, for many of them are cracked to related hydrocarbons under such conditions. Nevertheless, all olefinic hydrocarbons and their hydrocarbon decomposition products, which are in the vapor phase under the herein-defined reaction conditions, serve the purpose of the present invention. It is to be understood, also, that hydrocarbon mixtures containing one or more olefinic hydrocarbons may also be used herein, and that when such mixtures are used, the reaction conditions, such as contact time, will be slightly different in view of the dilution effect of the constituents present with the olefinic hydrocarbon or hydrocarbons. Accordingly, olefinic hydrocarbons, mixtures thereof, and hydrocarbon mixtures containing one or more of such olefinic hydrocarbons may be used.

Although any olefinic hydrocarbon having at least one olefin group may be utilized in our process, we especially prefer to use those containing up to about ten carbon atoms and, of these, propylene, butenes, and butadienes are especially preferred.

The proportions of reactions, i. e., olefinic hydrocarbons having at least one olefin group and ammonia, used in our process may be varied over a wide range with little effect on the conversion per pass and ultimate yield. In general, the charge of reactants may contain as little as two mol per cent or as much as ninety-eight mol per cent of olefinic hydrocarbons. In practice, however, we use charges containing between about twenty mol per cent and about ninety mol per cent of olefinic hydrocarbon, and ordinarily, we prefer to use charges containing a molar excess of ammonia over the olefinic hydrocarbon reactant.

We have found that the catalysts to be used to produce nitriles containing at least two carbon atoms, by reacting olefinic hydrocarbons having at least one olefin group, with ammonia, are those containing a metal salt of tungstic acid, such as iron tungstate, a metal salt of molybdic acid, such as ferric molybdate, or a salt of nickel with an acid that is stable under reaction conditions, such as nickel phosphate or nickel sulfate. Any metal salt of tungstic acid, any metal salt of molybdic acid, or any nickel salt of an acid that is stable under the reaction conditions used herein is operative in the present process. They are not all equally effective, however. Hence, the iron salts of tungstic and molybdic acids, and nickel phosphate, are preferred.

While these metal salts exhibit different degrees of effectiveness when used per se, they generally possess additional catalytic activity when used in conjunction with the well known catalyst supports, such as alumina, silica gel, Carborundum, pumice, clays and the like. We especially prefer to use activated alumina ($Al_2O_3$) as a catalyst support, and we have found that a catalyst comprising an iron tungstate supported on activated alumina is particularly useful for our purpose. Without any intent of limiting the scope of the present invention, it is suspected that the enhanced catalytic activity of the supported catalysts is attributable primarily to their relatively large surface area.

The concentration of catalytic metal salt in the supported catalysts influences the conversion per pass. In general, the conversion per pass increases with increase in the concentration of catalytic metal salt. For example, we have found that a catalyst comprising twenty parts by weight of ferric molybdate on eighty parts by weight of activated alumina is more effective than one comprising ten parts by weight of ferric molybdate or ninety parts by weight of activated alumina. It is to be understood, however, that supported catalysts containing larger or smaller amounts of catalytic metal salts may be used in our process.

We have found also that in order to obtain initial maximum catalytic efficiency the catalysts should be conditioned prior to use in the process. As defined herein, conditioned catalysts are those which have been exposed to ammonia or hydrogen, or both, for a period of time, several minutes to several hours, depending upon the quantity, at temperatures varying between about 800° F. and about 1300° F. However, if desired, the conditioning treatment may be dispensed with inasmuch as the catalyst becomes conditioned during the initial stages of our process when the catalyst comes in contact with the ammonia reactant.

In operation, the catalysts become fouled with carbonaceous material which ultimately affects their catalytic activity. Accordingly, when the efficiency of the catalyst declines to a point where further operation becomes uneconomical or disadvantageous from a practical standpoint, the catalyst may be regenerated, as is well known in the art, by subjecting the same to a careful oxidation treatment; for example, by passing a stream of air or air diluted with flue gases over the catalyst under appropriate temperature conditions and for a suitable period of time, such as the same period of time as the catalytic operation. Preferably, the oxidation treatment is followed by a purging treatment, such as passing over the catalyst a stream of purge gas, for example, nitrogen, carbon dioxide, hydrocarbon gases, etc.

The reaction or contact time, i. e., the period of time during which a unit volume of the reactants is in contact with a unit volume of catalyst, may vary between a fraction of a second and several minutes. Thus, the contact time may be as low as 0.01 second and as high as twenty minutes. We prefer to use contact times varying between 0.1 second and one minute, and more particularly, contact times varying between 0.3 second and thirty seconds.

In general, the temperatures to be used in our process may vary between about 800° F. and up to the decomposition temperature of ammonia (about 1250–1300° F.), and preferably, temperatures varying between about 850° F. and about 1075° F. The preferred temperature to be used in any particular operation will depend upon the nature of the olefinic hydrocarbon reactant used and upon the type of catalyst employed. Generally speaking, the higher temperatures increase the conversion per pass but they also increase the decomposition of the reactants, thereby decreasing the ultimate yields of nitriles. Accordingly, the criteria for determining the optimum temperature to be used in any particular operation will be based on the nature of the olefinic hydrocarbon reactant, the type of catalyst, and a consideration of commercial feasibility from the standpoint of striking a practical balance between conversion per pass and losses to decomposition. In general, about 100° F. higher reaction temperatures are required, when the catalyst is a metallic salt of tungstic acid, than is required when the catalyst is a metallic salt of molybdic acid, or a nickel salt of an acid that is stable under the reaction conditions of the process of the present application.

The process of the present invention may be carried out at superatmospheric, atmospheric or subatmospheric pressures. Superatmospheric pressures are advantageous in that the unreacted charge materials condense more readily. Subatmospheric pressures appear to favor the reactions involved since the reaction products have a larger volume than the reactants and, hence, it is evident from the law of Le Chatelier-Braun that the equilibrium favors nitrile formation more at reduced pressures. However, such pressures reduce the throughput of the reactants and present increased difficulties in recycling unreacted charge materials. Therefore, atmospheric pressure or superatmospheric pressures are preferred.

At the present time, the reaction mechanism involved in the process of the present invention is not fully understood. Fundamentally, the simplest possible method of making nitriles is to introduce nitrogen directly into the olefinic hydrocarbon molecule, thereby avoiding intermediate steps with their accompanying increased cost. In our process, we have noted that considerable amounts of hydrogen are evolved; that when olefinic hydrocarbons higher than ethylene are employed, aliphatic nitriles having fewer carbon atoms than the olefinic hydrocarbon reactant predominate in the reaction product; and that when olefinic hydrocarbons containing at least six carbon atoms are employed, aliphatic nitriles as well as aromatic nitriles are obtained. Hence, it is postulated, without any intent of limiting the scope of the present invention, that in our process, the aliphatic nitriles are formed in accordance with the following equations, using propylene as an example:

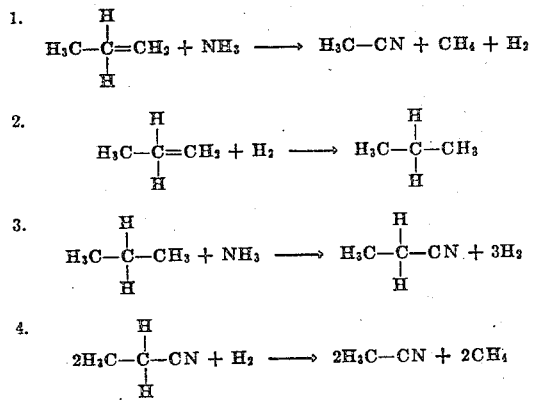

and that when olefinic hydrocarbons containing at least six carbon atoms are employed, the aliphatic nitriles are formed in accordance with the foregoing equations, while the aromatic nitriles are formed through cyclization of the olefinic hydrocarbon reactant followed by the introduction of nitrogen therein.

The present process may be carried out by making use of any of the well-known techniques for operating catalytic reactions in the vapor phase effectively. By way of illustration propylene and ammonia may be brought together in suitable proportions and the mixture vaporized in a preheating zone. The vaporized mixture is then introduced into a reaction zone containing a catalyst of the type defined hereinbefore. The reaction zone may be a chamber of any suitable type useful in contact-catalytic operations; for example, a catalyst bed contained in a shell, or a shell through which the catalyst flows concurrently, or countercurrently, with the reactants. The vapors of the reactants are maintained in contact with the catalyst at a predetermined elevated temperature and for a predetermined period of time, both as set forth hereinbefore, and the resulting reaction mixture is passed through a condensing zone into a receiving chamber. It will be understood that when the catalyst flows concurrently, or countercurrently, with the reactants in a reaction chamber, the catalyst will be thereafter suitably separated from the reaction mixture by filtration, etc. The reaction mixture will be predominantly a mixture of aliphatic nitriles, hydrogen, unchanged propylene, and unchanged ammonia. The aliphatic nitriles will be condensed in passing through the condensing zone and will be retained in the receiving chamber. The aliphatic nitriles can be separated from each other by any of the numerous and well known separation procedures, such as fractional distillation. Similarly, the uncondensed hydrogen, the unchanged propylene, and unchanged ammonia can be separated from each other by water scrubbing, etc. The unchanged propylene and ammonia can be recycled, with or without fresh propylene and ammonia, to the process.

It will be apparent that the process may be operated as a batch or discontinuous process as by using a catalyst-bed-type reaction chamber in which the catalytic and regeneration operations alternate. With a series of such reaction chambers, it will be seen that as the catalytic operation is taking place in one or more of the reaction chambers, regeneration of the catalyst will be taking place in one or more of the other reaction chambers. Correspondingly, the process may be continuous when we use one or more catalyst chambers through which the catalyst flows in contact with the reactants. In such a continuous process, the catalyst will flow through the reaction zone in contact with the reactants and will thereafter be separated from the reaction mixture as, for example, by accumulating the catalyst on a suitable filter medium, before condensing the reaction mixture. In a continuous process, therefore, the catalyst—fresh or regenerated—and the reactants—fresh or recycle—will continuously flow through a reaction chamber.

The following detailed examples are for the purpose of illustrating modes of preparing nitriles in accordance with the process of our invention, it being clearly understood that the invention is not to be considered as limited to the specific olefinic hydrocarbon reactants or the specific catalysts disclosed therein or to the manipulations and conditions set forth in the examples. As it will be apparent to those skilled in the art, a wide variety of other olefinic hydrocarbons and other catalysts of the type described hereinbefore may be used.

*Example I*

A catalyst consisting of 10% iron tungstate and 90% activated alumina was prepared as follows: 500 cc. of activated alumina, 4–8 mesh, was added to a solution containing an amount of ferric nitrate sufficient to give a 10% final catalyst concentration. The alumina was soaked in the solution for one hour and then the solution was evaporated to dryness. A solution of ammonium tungstate was prepared by dissolving sufficient tungstic oxide in 100 cc. of concentrated ammonium hydroxide and 400 cc. of water, to react with the ferric nitrate. The iron impregnated alumina was added to this solution, soaked one hour and the solution evaporated to dryness. The catalyst was then oven-dried at 150° F. and muffled for 4 hours at 900° F.

Propylene and ammonia were passed over the catalyst so formed, at 1025° F., at atmospheric pressure, with a contact time of 9 seconds, and in a ratio of 3 mols of ammonia to 1 of propylene. 6% by weight of the total charge was converted to acetonitrile and 1.1% by weight of the total charge was converted into propionitrile in one pass.

Example II

A mixture of ammonia and mixed C₃-hydrocarbons (30% propylene and 70% propane) was passed over a catalyst prepared as in Example I, at 1025° F., at atmospheric pressure with a 4.5 seconds contact time, using 2 mols of ammonia to 1 mol of hydrocarbon reactant. 13% by weight of the propylene charged was converted to acetonitrile in one pass.

Example III

A catalyst was prepared in accordance with the procedure outlined in Example I, so as to contain 14% of ferric molybdate and 86% of activated alumina. A mixture of ammonia and C₃-hydrocarbons (30% propylene and 70% propane) was passed over this catalyst at 925° F., at atmospheric pressure and with a contact time of 4.5 seconds, using 2 mols of ammonia and 1 mol of hydrocarbon. 33% by weight of the propylene charged was converted to acetonitrile in one pass.

Example IV

A catalyst consisting of 10% nickel phosphate and 90% activated alumina was prepared in a generally similar manner and a mixture of ammonia and C₃-hydrocarbons (30% propylene and 70% propane) was passed thereover at 925° F., 4.5 seconds contact time, under atmospheric pressure, and in a molar ratio of ammonia to hydrocarbon of 2 to 1. 15% by weight of the propylene charged was converted to acetonitrile in one pass.

It will be apparent that the present invention provides an efficient, inexpensive and safe process for obtaining nitriles. Our process is of considerable value in making available relatively inexpensive nitriles which are useful, for example, as intermediates in organic synthesis.

This application is a continuation-in-part of application Serial No. 539,033, filed June 6, 1944, now abandoned.

What is claimed is:

1. A process for the production of nitriles having at least two carbon atoms per molecule, which comprises contacting an olefinic hydrocarbon containing up to about ten carbon atoms per molecule with ammonia, in gaseous phase, at temperatures falling within the range varying between about 850° F. and about 1075° F., and in the presence of a catalyst including a metal salt selected from the group consisting of the metal salts of molybdic acid and the metal salts of tungstic acid.

2. A process for the production of nitriles having at least two carbon atoms per molecule, which comprises contacting an olefinic hydrocarbon containing up to about ten carbon atoms per molecule with ammonia, in gaseous phase, at temperatures falling within the range varying between about 850° F. and about 1075° F., and in the presence of a catalyst including a metal salt selected from the group consisting of the metal salts of molybdic acid and the metal salts of tungstic acid, supported on a catalyst support.

3. A process for the production of nitriles having at least two carbon atoms per molecule, which comprises contacting an olefinic hydrocarbon containing up to about ten carbon atoms per molecule with ammonia, in gaseous phase, at temperatures falling within the range varying between about 850° F. and about 1075° F., and in the presence of a catalyst including a metal salt selected from the group consisting of the metal salts of molybdic acid and the metal salts of tungstic acid, supported on alumina.

4. A process for the production of nitriles having at least two carbon atoms per molecule, which comprises contacting propylene with ammonia, in gaseous phase, at temperatures falling within the range varying between about 850° F. and about 1075° F., and in the presence of iron tungstate.

5. A process for the production of nitriles having at least two carbon atoms per molecule, which comprises contacting propylene with ammonia, in gaseous phase, at temperatures falling within the range varying between about 850° F. and about 1075° F., and in the presence of iron tungstate supported on a catalyst support.

6. A process for the production of nitriles having at least two carbon atoms per molecule, which comprises contacting propylene with ammonia, in gaseous phase, at temperatures falling within the range varying between about 850° F. and about 1075° F., and in the presence of iron tungstate supported on alumina.

7. A process for the production of nitriles having at least two carbon atoms per molecule, which comprises contacting propylene with ammonia, in gaseous phase, at temperatures falling within the range varying between about 850° F. and about 1075° F., and in the presence of iron molybdate.

8. A process for the production of nitriles having at least two carbon atoms per molecule, which comprises contacting propylene with ammonia, in gaseous phase, at temperatures falling within the range varying between about 850° F. and about 1075° F., and in the presence of iron molybdate supported on a catalyst support.

9. A process for the production of nitriles having at least two carbon atoms per molecule, which comprises contacting propylene with ammonia, in gaseous phase, at temperatures falling within the range varying between about 850° F. and about 1075° F., and in the presence of iron molybdate supported on alumina.

WILLIAM I. DENTON.
RICHARD B. BISHOP.

REFERENCES CITED

The following references are of record in the file of this patent:

UNITED STATES PATENTS

| Number | Name | Date |
|---|---|---|
| 1,920,795 | Jaeger | Aug. 1, 1933 |
| 1,934,838 | Andrussow | Nov. 14, 1933 |
| 2,331,968 | Forney | Oct. 19, 1943 |
| 2,381,709 | Apgar et al. | Aug. 7, 1945 |
| 2,432,532 | Mahan | Dec. 16, 1947 |